No. 612,349. Patented Oct. 11, 1898.
F. G. KOLLENBERG.
MIXER FOR LIQUIDS.
(Application filed Dec. 16, 1897.)
(No Model.)
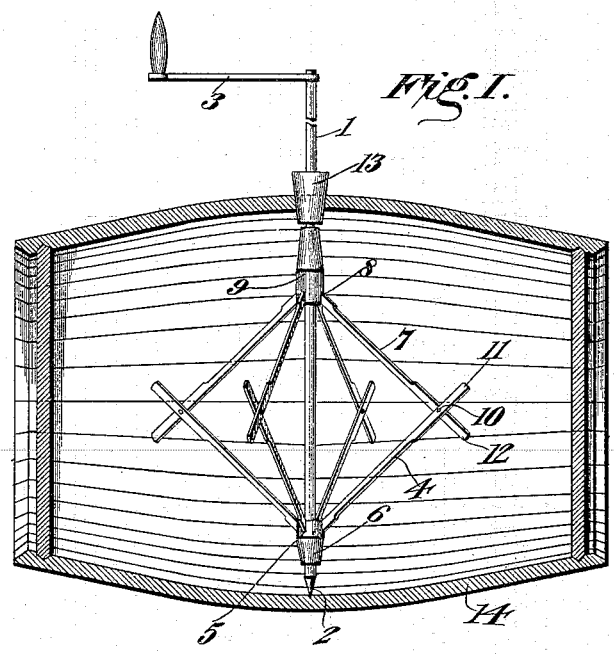
Fig. I.
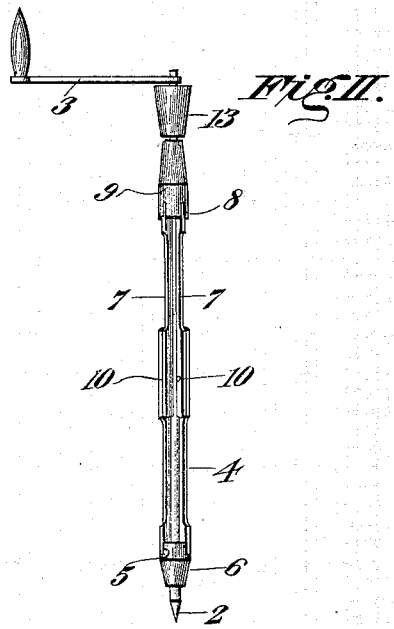
Fig. II.
Witnesses
M. Fowler.
Stephen A. Brooks.
Inventor:
Frederick G. Kollenberg
By Joseph L. Atkins,
Attorney.

UNITED STATES PATENT OFFICE.

FREDERICK G. KOLLENBERG, OF OWENSBOROUGH, KENTUCKY, ASSIGNOR OF ONE-HALF TO JAMES J. SWEENEY, OF SAME PLACE.

MIXER FOR LIQUIDS.

SPECIFICATION forming part of Letters Patent No. 612,349, dated October 11, 1898.

Application filed December 16, 1897. Serial No. 662,237. (No model.)

*To all whom it may concern:*

Be it known that I, FREDERICK G. KOLLENBERG, a citizen of the United States of America, residing in Owensborough, Daviess county, Kentucky, have invented a certain new and useful improvement in mixers used in mixing whisky, wines, vinegar, spirits, and all other liquids that may be mixed in barrels, kegs, or casks; and I do hereby declare that the following is a full and exact description of the invention, which will enable others skilled in the art to which it appertains to make and use the same.

The object of this invention is to produce a new and improved apparatus for effectually stirring and mixing the contents of barrels or similar receptacles; and the invention consists in the combination and arrangement of parts for simplifying and rendering the apparatus more efficient that is hereinafter specified in detail and succinctly described in the appended claim.

In the accompanying drawings, Figure I is a central vertical longitudinal section of a barrel with my mixer illustrated as within the same in position for operation. Fig. II is a side elevation of my mixer folded, as when not in use.

Referring to the figures on the drawings, 1 represents the main shaft of my mixer, which is preferably of cylindrical shape and of a length sufficient to accommodate it for operation within barrels or other receptacles of required size. In practice the rod extends from the inner surface of one side of the barrel outwardly through an opening in the opposite side—for example, the bung-hole of a barrel—a sufficient distance to afford means for rotating the shaft. The rod is preferably made of some suitable metal—for example, copper—and is preferably provided upon its inner extremity with a point 2 and on its outer end with a crank-handle 3.

4 indicates a series of arms or blades which are pivotally connected, as indicated at 5, to the rod 1 near its lower end, a fixed collar 6 being preferably provided for the accommodation of the pivotal connection of the arms 4 with the rod. 7 indicates another series of arms or blades, that are pivotally connected, as indicated at 8, to a sleeve 9, loose upon the rod, and are also pivotally connected, respectively, as indicated at 10, to the arms or blades 4, previously described. The pivotal connection 10 between the respective arms 4 and 7 is preferably located a little distance from the outer extremity of each of the connected arms, so as to leave projecting wings 11 and 12 upon the arms 4 and 7, respectively. The wings 11 and 12 are designed to enlarge the field of movement of the blades, and thereby to increase their efficiency as agitating members; but in that respect, as in others, the shaft of the blades or arms may be widely and materially varied without departing from the scope of my invention.

13 indicates a movable bung loosely mounted upon the shaft 1 between the sleeve 9 and the crank-handle 3.

14 indicates a barrel into which my mixer is shown in Fig. I as introduced and expanded as in use.

In operation, the blades being folded together upon the shaft 1, as illustrated in Fig. II, the apparatus is introduced into the interior of the receptacle whose contents are to be mixed by agitation, the receptacle illustrated being a barrel. The shaft is directed squarely through the aperture or bung-hole through which it is introduced, and its pointed end 2 is driven into the opposite side of said receptacle sufficiently to afford a stable bearing for holding the lower end of the shaft during its rotation. After the insertion and fixing of the shaft in position the movable bung 13 is slipped down upon the rod 1 and inserted into the bung-hole. The bung 13 drives the sleeve 9 before it and causes the arms 4 and 7 to expand, as illustrated in Fig. I. After the bung 13 is inserted into the bung-hole a second bearing for the shaft 1 is thereby provided and the shaft is ready to be rotated through employment of the crank 13. After the shaft has been rotated sufficiently to thoroughly agitate and commingle the contents of the barrel the bung 13 is extracted and the shaft 1 lifted until the sleeve 9 protrudes sufficiently through the bung-hole to enable an operator to grasp it, whereupon the sleeve is slipped upwardly upon the shaft 1, carrying the bung with it until the parts are restored to the position shown in Fig. II, when the mixer may be withdrawn from the aperture through which it was in the first place introduced.

What I claim is—

A mixer or blending device adapted to be inserted through the bung-hole of a barrel, or other receptacle, consisting of a rotatable shaft, blades pivotally connected with the lower ends thereof, a vertically-movable sleeve on said shaft, blades pivotally connected with said sleeve, and with said first-mentioned blades, and a vertically-movable bung upon the shaft, substantially as described.

In testimony whereof I have signed this specification in the presence of two subscribing witnesses.

FREDERICK G. KOLLENBERG.

Witnesses:
ROBERT G. MATHEWS,
JAS. C. SLACK.